United States Patent [19]
Panwar et al.

[11] Patent Number: 5,870,597
[45] Date of Patent: Feb. 9, 1999

[54] METHOD FOR SPECULATIVE CALCULATION OF PHYSICAL REGISTER ADDRESSES IN AN OUT OF ORDER PROCESSOR

[75] Inventors: Ramesh Panwar, Santa Clara; Dani Y. Dakhil, Campbell, both of Calif.

[73] Assignee: Sun Microsystems, Inc., Palo Alto, Calif.

[21] Appl. No.: 881,051

[22] Filed: Jun. 25, 1997

[51] Int. Cl.[6] .................................................. G06F 9/34
[52] U.S. Cl. ........................................... 395/571; 711/209
[58] Field of Search ............................... 395/800.23, 569, 395/571; 711/200, 209

[56] References Cited

U.S. PATENT DOCUMENTS

| | | | |
|---|---|---|---|
| 5,134,561 | 7/1992 | Liptay | 711/164 |
| 5,159,680 | 10/1992 | Joy et al. | 395/800.41 |
| 5,226,142 | 7/1993 | Vegesna et al. | |
| 5,392,411 | 2/1995 | Ozaki | 711/1 |
| 5,437,043 | 7/1995 | Fujii et al. | 395/800.01 |
| 5,440,714 | 8/1995 | Wang | 711/165 |
| 5,487,156 | 1/1996 | Popescu et al. | 395/393 |
| 5,546,597 | 8/1996 | Martell et al. | 395/800.23 |
| 5,560,032 | 9/1996 | Nguyen et al. | 395/800.23 |
| 5,561,776 | 10/1996 | Popescu et al. | 395/586 |
| 5,561,784 | 10/1996 | Chen et al. | 711/157 |
| 5,625,837 | 4/1997 | Popescu et al. | 395/800.23 |
| 5,680,565 | 10/1997 | Glew et al. | 711/205 |

OTHER PUBLICATIONS

David L. Weaver/Tom Germond, *The SPARC Architecture Manual*, SPARC International, Inc., Version 9, 1994, pp. 29–60, 79–85, 214–215, 239–240.

*Primary Examiner*—Krisna Lim
*Attorney, Agent, or Firm*—James A. Pinto; William J. Kubida; Holland & Hart LLP

[57] ABSTRACT

In a processor speculatively executing instructions which specify logical addresses, a method and apparatus for speculatively converting logical addresses to physical addresses. The processor has a register window movable within a register file, a window pointer register maintaining a value corresponding to the location of the window in the register file, a speculative window pointer register maintaining a speculative value of the window pointer register. A controller identifies an instruction expected to modify the value in the window pointer register, and in response to identifying the instruction the controller modifies the speculative value. A mapper, coupled to the speculative window pointer register, converts the instruction specified logical addresses to physical addresses based on the speculative value contained in the speculative window pointer register.

11 Claims, 7 Drawing Sheets

METHOD FOR SPECULATIVE CALCULATION OF PHYSICAL REGISTER ADDRESSES IN AN OUT OF ORDER PROCESSOR

CROSS-REFERENCES TO RELATED APPLICATIONS

The subject matter of the present application is related to that of copending U.S. patent application Ser. No. 08/881,958 identified as Docket No. P2345/37178.830071.000 for AN APPARATUS FOR HANDLING ALIASED FLOATING-POINT REGISTERS IN AN OUT-OF-ORDER PROCESSOR filed on Jun. 25, 1997 concurrently herewith by Ramesh Panwar; Ser. No. 08/881,729 identified as Docket No. P2346/37178.830072.000 for APPARATUS FOR PRECISE ARCHITECTURAL UPDATE IN AN OUT-OF ORDER PROCESSOR filed on Jun. 25, 1997 concurrently herewith by Ramesh Panwar and Arjun Prabhu; Ser. No. 08/881,726 identified as Docket No. P2348/37178.830073.000 for AN APPARATUS FOR NON-INTRUSIVE CACHE FILLS AND HANDLING OF LOAD MISSES filed on Jun. 25, 1997 concurrently herewith by Ramesh Panwar and Ricky C. Hetherington; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed on Jun. 25, 1997 concurrently herewith by Ramesh Panwar and Dani Y. Dakhil; Ser. No. 08/882,173 identified as Docket No. P2350/37178.830075.000 for AN APPARATUS FOR ENFORCING TRUE DEPENDENCIES IN AN OUT-OF-ORDER PROCESSOR filed on Jun. 25,1997 concurrently herewith by Ramesh Panwar and Dani Y. Dakhil; Ser. No. 08/881,145 identified as Docket No. P2351/37178.830076.000 for APPARATUS FOR DYNAMICALLY RECONFIGURING A PROCESSOR on Jun. 25, 1997 filed concurrently herewith by Ramesh Panwar and Ricky C. Hetherington; Ser. No. 08/881,732 identified as Docket No. P2353137178.830077.000 for APPARATUS FOR ENSURING FAIRNESS OF SHARED EXECUTION RESOURCES AMONGST MULTIPLE PROCESSES EXECUTING ON A SINGLE PROCESSOR on Jun. 25,1997 concurrently herewith by Ramesh Panwar and Joseph I. Chamdani; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed on Jun. 25, 1997 concurrently herewith by Ramesh Panwar; Ser. No. 08/881,731 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed on Jun. 25, 1997 concurrently herewith by Ramesh Panwar, P. K. Chidambaran and Ricky C. Hetherington; Ser. No. 08/881,731 identified as Docket No. P2369/37178.830081.000 for APPARATUS FOR TRACKING PIPELINE RESOURCES IN A SUPERSCALAR PROCESSOR filed on Jun. 25, 1997 concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed on Jun. 25, 1997 concurrently herewith by Ramesh Panwar and Ricky C. Hetherington; Ser. No. 08/881,220 identified as Docket No. P2371/37178.830083.000 for AN APPARATUS FOR HANDLING REGISTER WINDOWS IN AN OUT-OF-ORDER PROCESSOR filed concurrently on Jun. 25, 1997 concurrentlyherewith by Ramesh Panwar and Dani Y. Dakhil; Ser. No. 08/881,847 identified as Docket No. P2372/37178.830084.000 for AN APPARATUS FOR DELIVERING PRECISE TRAPS AND INTERRUPTS IN AN OUT-OF-ORDER PROCESSOR filed on Jun. 25,1997 concurrently herewith by Ramesh Panwar; Ser. No. 08/881,728 identified as Docket No. P2398/37178.830085.000 for NON-BLOCKING HIERARCHICAL CACHE THROTTLE filed on Jun. 25, 1997 concurrently herewith by Ricky C. Hetherington and Thomas M. Wicki; Ser. No. 08/881,727 identified as Docket No. P2406/37178.830086.000 for NON-THRASHABLE NON-BLOCKING HIERARCHICAL CACHE filed on Jun. 25, 1997 concurrently herewith by Ricky C. Hetherington, Sharad Mehrotra and Ramesh Panwar; Ser. No. 08/881,065 identified as Docket No. P2408/37178.830087.000 for IN-LINE BANK CONFLICT DETECTION AND RESOLUTION IN A MULTI-PORTED NON-BLOCKING CACHE filed on Jun. 25, 1997 concurrently herewith by Ricky C. Hetherington, Sharad Mehrotra and Ramesh Panwar; and Ser. No. 08/881,613 identified as Docket No. P2434/37178.830088.000 for SYSTEM FOR THERMAL OVERLOAD DETECTION AND PREVENTION FOR AN INTEGRATED CIRCUIT PROCESSOR filed on Jun. 25, 1997 concurrently herewith by Ricky C. Hetherington and Ramesh Panwar, the disclosures of which applications are herein incorporated by this reference.

BACKGROUND OF THE INVENTION

1. Field of the Invention

This invention relates in general to microprocessors, and more particularly, to microprocessor architectures and methods for speculatively translating logical register addresses to physical addresses in an out-of-order processor having register windows.

2. Relevant Background

Modern designs of computer processors (also called microprocessors) provide registers for storing data or for providing status or control information regarding the state of the processor. With respect to data registers for storing program data during execution within the processor, a variety of register organization structures exist. One way to organize registers within a processor is to use a register windowing technique to access a plurality of registers in a register file. With register windowing, a register window has a predetermined number of contiguous registers, and the window can be moved linearly within the register file. At any one time, the register window permits program access to a subset of the total number of registers in the register file. Control registers are also associated with the register windows so that a program can manipulate the position of the window within the register file and monitor the status of the window.

For example, in the specification for a scaleable processor architecture, SPARC-V9, the general purpose registers for storing and manipulating data are arranged in register sets accessible through register windows, each register window having 32 registers. A particular processor can have multiple register sets ranging from three register sets to 32 register sets. Individual registers are addressable using a five-bit address in conjunction with a current window pointer (CWP). The register window is movable within the register sets such that a program can logically address multiple physical registers in the register sets by simply tracking a logical register name or specifier (i.e.,r[3] or r[28]) and the current window pointer.

The five-bit register addresses encoded in an instruction word specify the instruction's source registers and the destination register. These register specifiers are logical addresses that index registers within the current register window. Because the register window is movable within the larger register file, the physical address of each register specified by a instruction will depend on the location of the current register window within the register file.

In a processor executing instructions speculatively or out-of-order, it is useful to track the physical addresses of the registers logically specified by an instruction. For instance, instruction dependency checking requires that instructions referencing the same physical register are detected so that these instructions can be executed in the proper order to eliminate the dependency.

Further, if instructions are speculatively processed within the processor, handling an instruction which is down the wrong path or mispredicted branch which may affect the position of the register window is problematic.

What is needed is a processor and method for speculatively translating logical register addresses to physical addresses accounting for the expected position of the register window within the register file.

SUMMARY OF THE INVENTION

The above problems have been solved by maintaining speculative copies of the window management registers (for example, the CWP, CANSAVE, CANRESTORE registers) and using the speculative copies to map the logical registers specified by an instruction into the physical registers from the windowed register file. The speculative copies of the window management registers are also used to determine the occurrence of overflow and underflow traps associated with the window. The speculative copy is always ahead of the architectural copy except at certain synchronization points when both the speculative and architectural copies are synchronized. If a branch misprediction occurs which affects the status or position of the window, a window repair table is used to restore the state of the speculative window management registers.

In a method implementation, a method is disclosed for speculatively calculating a physical register address from a logical register address specified by an instruction in a processor. A register file is provided comprising a plurality of registers accessible through a window movable within the register file, each register uniquely identified within the window by a logical address. A window pointer register is provided to maintain a value corresponding to the location of the window in the register file, and a speculative value of the window pointer register is maintained. An identifying step identifies an instruction expected to modify the value in the window pointer register. In response to the identifying step, a modifying step modifies the speculative value. A converting step converts the instruction specified logical address to a physical address based on the speculative value of the window pointer register.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Instructions operating within a processor generally specify a first source register, a second source register, and a destination register. These registers are encoded within the instruction using logical addresses (i.e., r0, r3, r12). Because it is necessary in an out-of-order processor to check for dependencies between instructions prior to issuing the instructions for execution, the present invention speculatively converts the logical addresses of registers specified by an instruction to the physical addresses of the registers in order to determine dependencies between instructions. The apparatus and method of the present invention will be described herein, particularly with reference to FIGS. 4–7.

Figure 1:
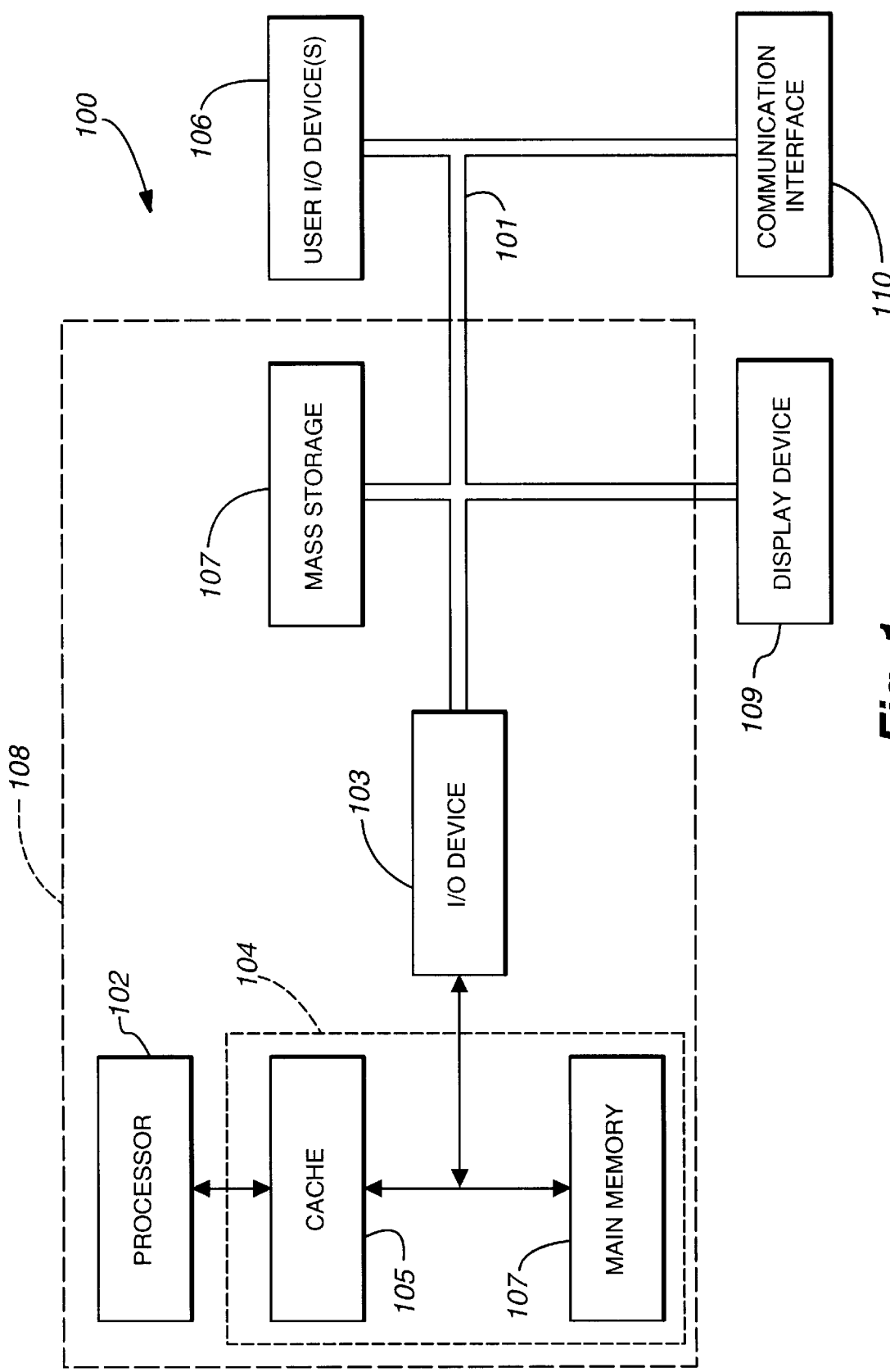
FIG. 1 shows in block diagram form a computer in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
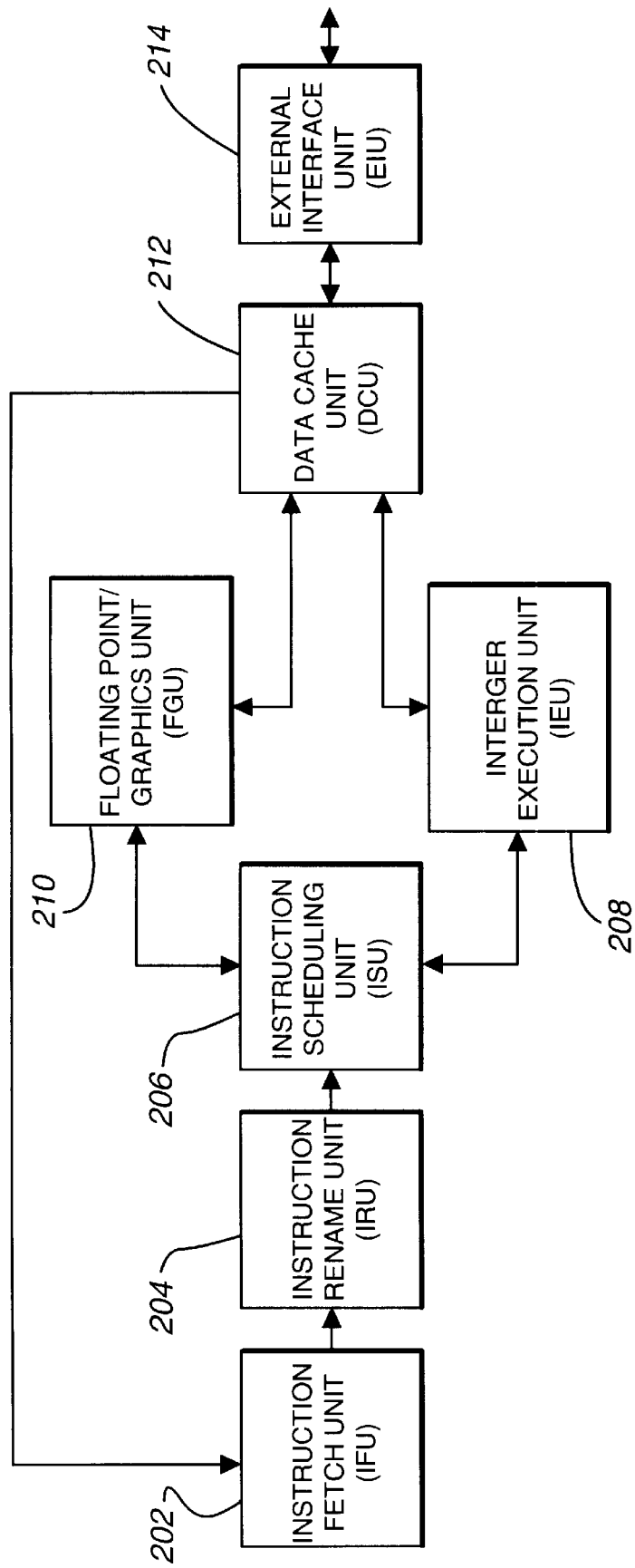
FIG. 2 shows a processor in block diagram in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle—known as an instruction bundle. Any number of instructions may be included in a bundle to meet the needs of a particular application.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address. If a branch is mispredicted, the instructions processed from the mispredicted branch are flushed from the processor, and the processor state is restored to the state prior to the mispredicted branch. For instructions which affect the speculative calculation of the physical address of a register, restoration of the processor's window management registers is discussed below with reference to FIGS. 6–7.

IRU 204 comprises one or more pipeline stages that include instruction renaming and dependency checking mechanisms. In accordance with the present invention, the instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched from the instruction cache, but has not yet completed or been retired.

IRU 204 outputs renamed instructions to instruction scheduling unit (ISU) 206, and indicates any dependency which the instruction may have on other prior live instructions. As will be described with reference to FIGS. 3–7, IRU 204 includes mechanisms to speculatively calculate the physical addresses of registers specified by an instruction so that instruction dependencies can be properly detected.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating-point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double-precision architectural registers as well as single and/or double-precision rename registers.

The floating point graphics and execution unit FGU 210 includes one or more pipelines, each comprising one or more stages that implement floating-point instructions. FGU 210 also includes mechanisms for holding the results and state of speculatively executed floating-point and graphic instructions. FGU 210 functions to perform final decoding of floating-point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating-point unit (FPU) in designs in which special purpose graphic and multimedia instructions are not used. FGU 210 preferably includes mechanisms to access single and/or double-precision architectural registers as well as single and/or double-precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

The apparatus and method for speculatively translating logical register addresses to physical addresses in accordance with the present invention is implemented primarily in the instruction renaming unit IRU 204.

Figure 3:
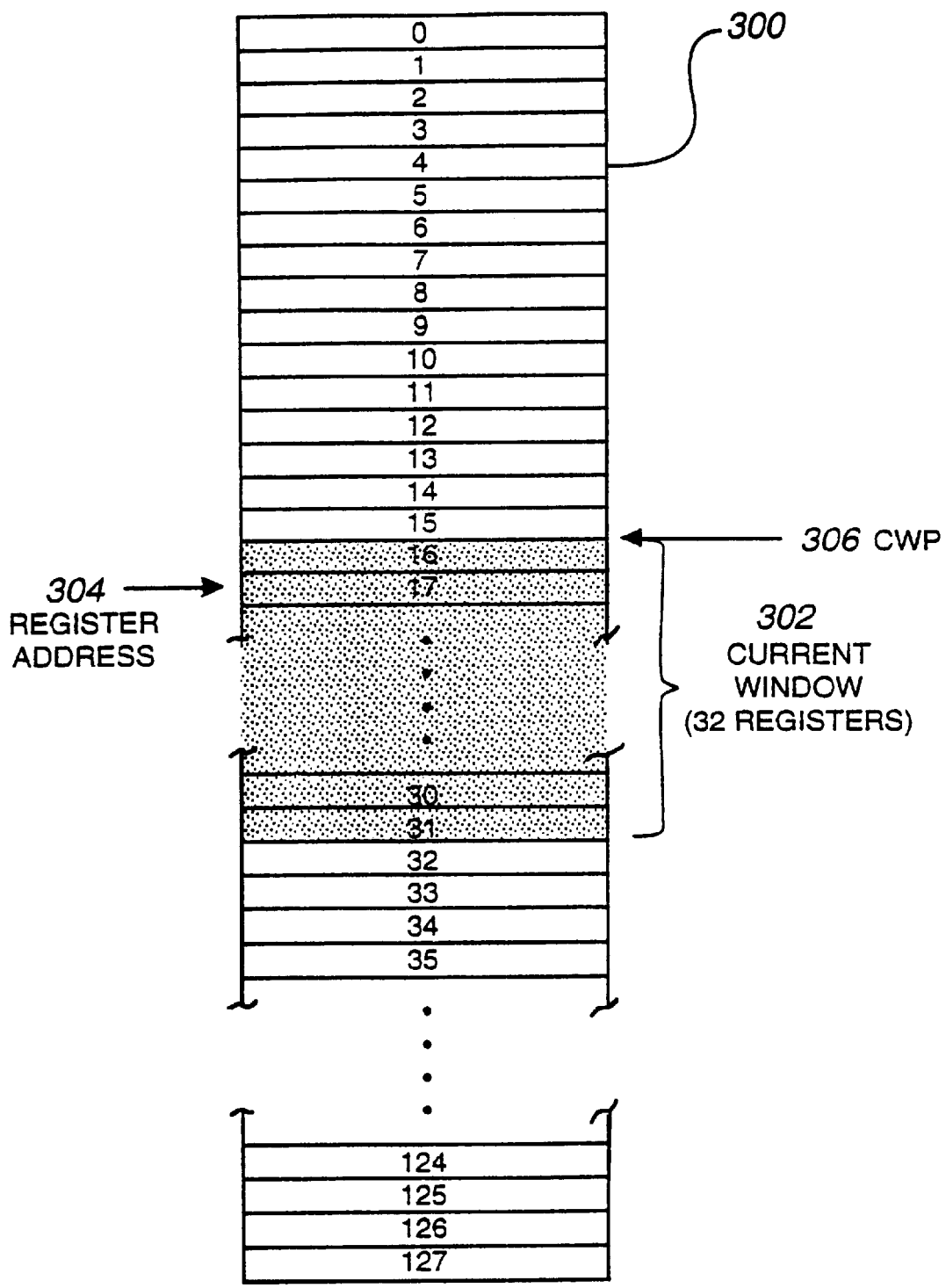
FIG. 3 illustrates a register file of 128 registers accessible through a movable 32-register window with a current window pointer (CWP).

Referring to FIG. 3, a register file 300 having 128 registers is shown with a window 302 having 32 registers. Window 302 is movable within the register file 300 by a program or process executing on processor 102. For example, different processes running within processor 102 could allocate their own register window 302 to access 32 registers independent of the other processes executing within the processor.

An individual register within window 302 is physically accessible through register address 304 and current window pointer (CWP) 306. Because the window 302 has 32 registers, the register address 304 will be a 5-bit address. A program, however, would access the registers through a typical naming convention such as r0, r1, r2. . . r29, r30, and r31. In this sense, the current window pointer 306 acts as an offset to address the registers contained in the current window 302. While register file 300 has been shown having 128 registers, and window 302 has been shown as having 32 registers, it will be understood that the size of the register file and register windows is a matter of choice depending upon the needs of a particular application, and as such do not limit the present invention.

In SPARC, certain instructions and architectural status registers relate to management of the register windows. As discussed above, a current window pointer (CWP) is maintained in a CWP register to track the current location of the window within the register file. A "SAVE" instruction allocates a new register window to the routine executing it, and saves the prior register window by incrementing the CWP register. A "RESTORE" instruction restores the previous register window (i.e., the register window saved by the last SAVE instruction executed by the current process) by decrementing the CWP register.

A window overflow occurs when a SAVE instruction is executed and the next register window is unavailable or occupied. An overflow causes a spill trap or exception that allows privileged software to save the occupied register window in memory, thereby making the window available for use. A window underflow occurs when a RESTORE instruction is executed and the previous register window contains no validly saved register data. An underflow causes a fill trap or exception that allows privileged software to load the window registers from memory.

A savable windows register (CANSAVE) contains the number of register windows following the CWP that are not in use and are available for allocation by a SAVE instruction without generating a window spill exception. A restorable windows register (CANRESTORE) contains the number of register windows preceding the CWP that are in use by the current program and can be restored, via a RESTORE instruction, without generating a window fill exception.

If the CANSAVE register equals 0, execution of a SAVE instruction causes a window spill (overflow) exception. If the SAVE instruction does not cause an exception, and a new register window is allocated, the CWP register is incremented, the CANSAVE register is decremented, and the CANRESTORE register is incremented.

If the CANRESTORE register equals 0, execution of a RESTORE instruction causes a window fill (underflow) exception. If the RESTORE instruction does not cause an exception, the previous register window is restored by decrementing the CWP register, the CANRESTORE value is decremented, and the CANSAVE value is incremented.

The state of the register windows is determined by a set of privileged window management registers comprising the CWP register, the CANSAVE register, and the CANRESTORE register. A write privileged register "WRPR" instruction permits writing data to these privileged registers.

In accordance with the present invention, speculative copies of these window management registers are maintained so that when a SAVE or RESTORE instruction is detected in an instruction bundle from the IFU 202, the proper physical address of a register specified by a subsequent instruction in the bundle can be speculatively calculated.

Figure 4:
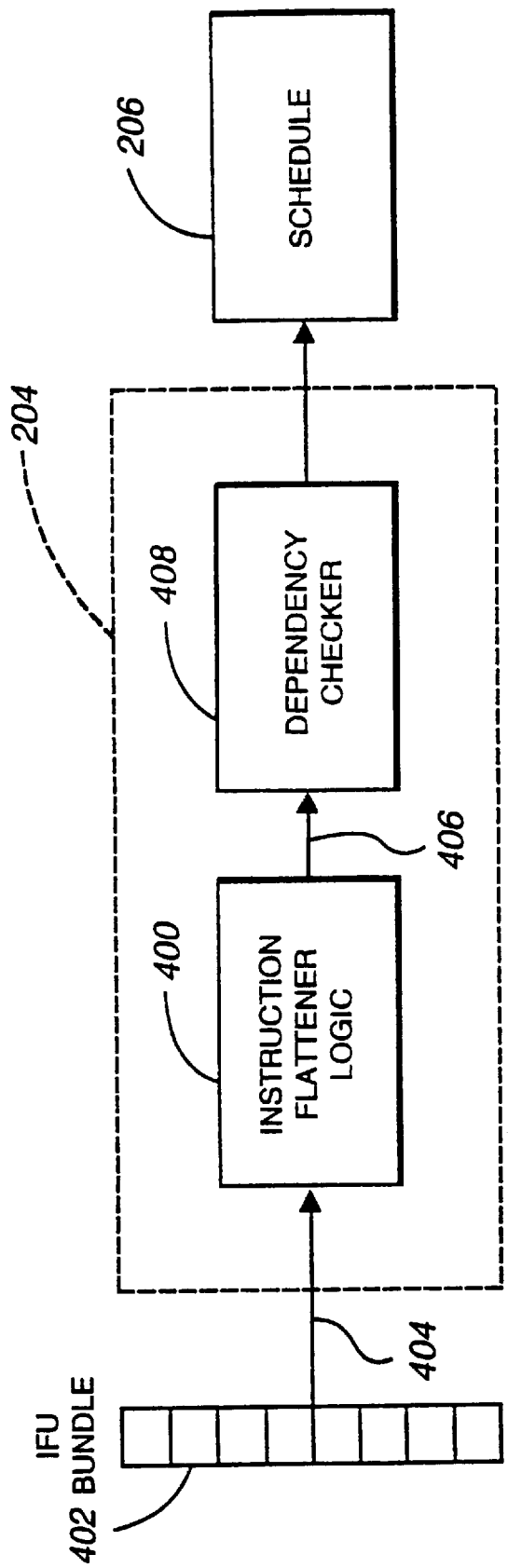
FIG. 4 shows a block diagram of the instruction renaming unit 204 having instruction flattening logic and a dependency checking module in accordance with the present invention.

FIG. 4 illustrates a block diagram showing instruction flattening logic 400 for processing the logical addresses specified by instructions in an instruction bundle 402. Mapping logical addresses to physical addresses is referred herein as "flattening" the windowed registers. When the windowed registers are flattened, each register is uniquely identified by physical address.

As mentioned above, the instruction bundle 402 contains up to eight instructions, each instruction specifying source registers and destination registers using logical addresses. The instruction flattener logic 400 speculatively converts the incoming logical register addresses 404 of an instruction into their expected actual physical addresses 406.

The physical register addresses 406 are used by dependency checker 408 to determine any true register/data dependencies between instructions, so that the instructions can be properly scheduled by the instruction scheduling unit 206 for execution within the processor. The ISU 206 will schedule instructions such that any instructions dependent upon the completion of other instructions will be scheduled for execution in the proper order. Instructions which have no dependency on prior instructions can be scheduled out-of-order to improve the performance of the processor.

Figure 5:
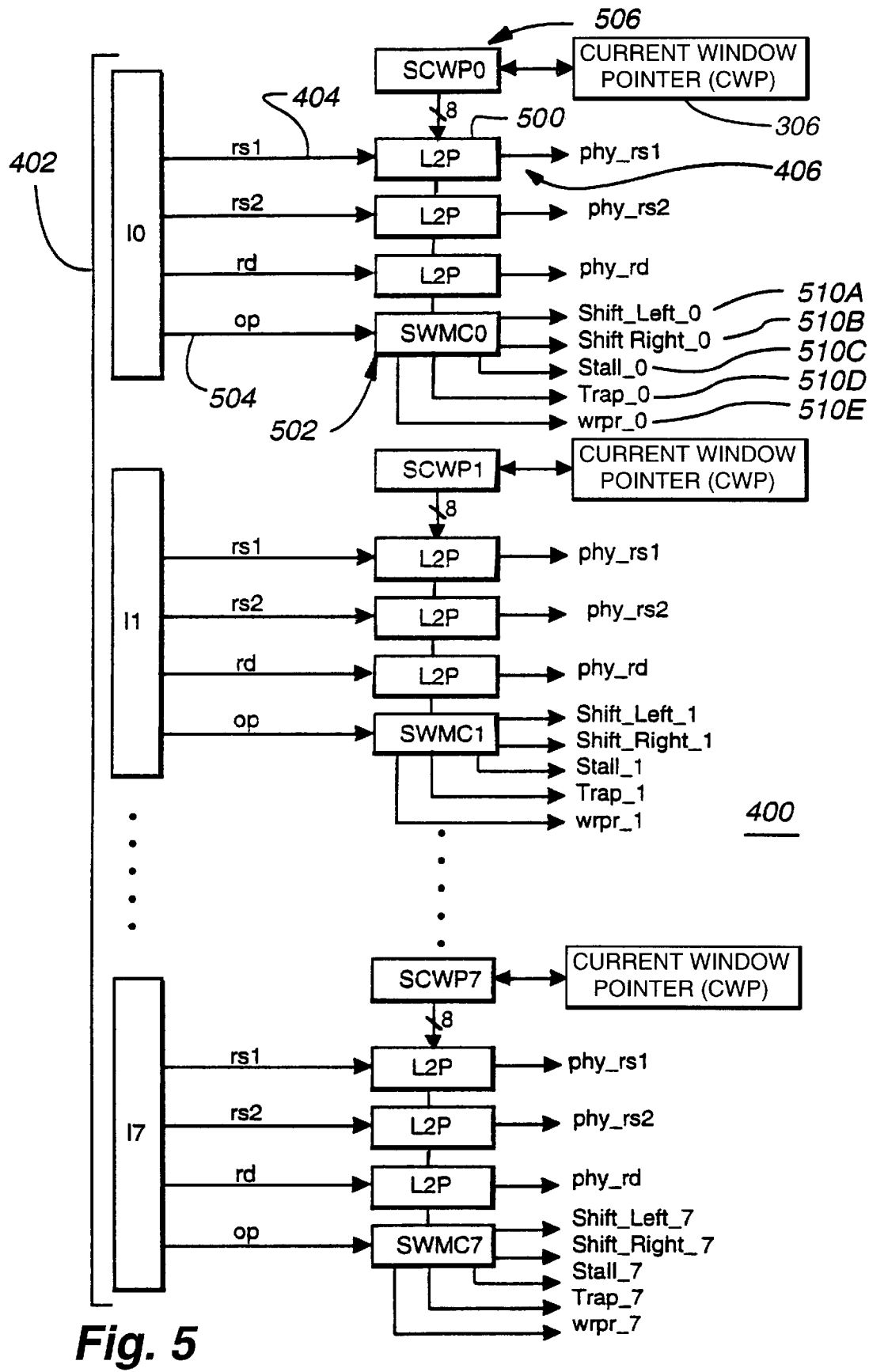
FIG. 5 illustrates the speculative window management controller and the speculative current window pointer for each instruction in a bundle in accordance with the present invention.

FIG. 5 illustrates a block diagram of an embodiment of the instruction flattener logic 400 in accordance with the present invention. A logical to physical (L2P) mapper 500 maps a logical address 404 of a register in a register window to a physical address 406. Each instruction (shown as I0, I1...I7) in the bundle 402 has an L2P mapper 500 for each register specifier, and a speculative window management controller (SWMC) 502 for the opcode 504 of the instruction. Each instruction in the bundle 402 also has a speculative copy 506 of the current window pointer 306.

As previously mentioned, each instruction within the instruction bundle 402 can have a first source register (rs1), a second source register (rs2), and a destination register (rd). Because these registers are specified within the instruction using logical addresses, the L2P mapper 500 converts the logical register address 404 into a physical register address 406 of a specified register. The L2P mapper 500 uses a speculative copy 506 of the current window pointer 306 to perform the conversion.

Since there are eight instructions in an incoming bundle of instructions, and each instruction in the bundle can specify up to three registers in the instruction, each instruction in an instruction bundle has three L2P mappers 500. A first mapper translates the logical address of the first source register rs1 to a physical address; a second mapper translates the logical address of a second source register rs2 to a physical address; and a third mapper translates the logical address of the destination register rd specified in the instruction to a physical address.

Because processor 102 utilizes a register file supporting multiple register windows movable within the register file, and because any instruction within the bundle can contain an instruction which is expected to shift the register window (i.e., a SAVE or RESTORE instruction), the present invention detects if an instruction within the bundle will shift or otherwise affect the location or status of the current register window. If so, the speculative copy 506 of the window pointer is altered to permit speculative calculation of the physical address of the register.

If, for example, the first instruction in the instruction bundle would shift the window pointer (i.e., a SAVE instruction), then in order to properly calculate speculatively the physical address of the registers specified by subsequent instructions in the bundle, the speculative copy of the current window pointer is altered for each subsequent instruction in the bundle. This speculative copy of the current window pointer is then used to calculate the physical register addresses of each register specified in the instructions.

The controller 502 identifies an instruction expected to modify the state of the register window. Controller 502 has as an input the speculative copy 506 of the current window pointer 306. Controller 502 also utilizes the opcode 504 of the particular instruction in the bundle to determine if the instruction is expected to affect the position or status of the current register window. Controller 502 can also anticipate window traps which are expected to occur in overflow or underflow conditions. As will be explained below with reference to FIG. 6 and 7, controller 502 can also restore the speculative copies of the CWP, CANSAVE, and CANRESTORE registers if the controller modified the values of the speculative copies in response to instructions in a branch later determined mispredicted.

The outputs of controller 502 comprise a shift left signal 510A, a shift right signal 510B, a stall signal 510C, a trap signal 510D, and a privileged WRPR signal 510E.

The shift left signal increments the speculative copy of the CWP for all subsequent instructions, and the shift right signal decrements the speculative copy of the CWP. The trap signal indicates the present instruction is expected to cause a window trap (i.e., a spill or fill trap). The WRPR signal indicates that the instruction is a WRPR privileged instruction to a window management register.

The speculative copies of the window management registers are generally out of synchronization with the values in the CWP, CANSAVE, and CANRESTORE architectural registers. Synchronizing the speculative and architectural copies of the window management registers is needed when the architectural copy is modified by a privileged WRPR instruction; after a window trap; or when the speculative copy needs to be reset back to a previous state after a branch misprediction.

When the controller 502 detects that the present instruction will affect the window management registers (but is not a privileged instruction) and will not cause a window trap, the controller asserts the stall output signal, and either the shift left signal or the shift right signal to alter the speculative value of the CWP for subsequent instructions. When the stall signal is asserted, the instructions in the bundle that follow the present instruction are stalled.

When an instruction in the bundle is a WRPR privileged instruction which affects a window management register, the controller 502 asserts the WRPR signal if none of the proceeding controllers have an asserted stall signal. In this case, all instructions in the same bundle are stalled. The stall will stay in effect until the WRPR instruction is executed and the target window management register is updated. The stall also stays in effect until the speculative copy of the window management registers are synchronized with the values in the CWP, CANSAVE, and CANRESTORE architectural registers. Stalling the pipeline in this instance is acceptable because the WRPR privileged write instruction to window management registers is not expected to occur very often.

Windowing traps such as a window spill or fill exception can be speculatively determined by controller 502. The controller maintains a speculative copy of the CWP register, along with speculative copies of the CANSAVE and CANRESTORE registers (shown in FIG. 6). For example, if the CANSAVE register equals zero and the controller detects a SAVE instruction, a window spill exception will be generated when the SAVE instruction is executed.

When an instruction expected to cause a window trap is detected by controller 502, the trap signal is asserted if none of the proceeding controllers have the stall signal asserted. In one embodiment of the invention, detection of a window trap causes cancellation of the instruction that caused the trap, and instructions following are canceled as well, until a bundle is received that contains the appropriate trap handler. A message can be sent to the instruction scheduling unit ISU notifying it of the trap. This message could contain all of the information needed to calculate the trap handler base address which is passed back to the instruction fetch unit IFU. The IFU then starts fetching the trap handler. When the trap is completely serviced by the trap handler routine, the speculative copies and the architectural copies of the CWP, CANSAVE, and CANRESTORE registers are synchronized.

Figure 6:
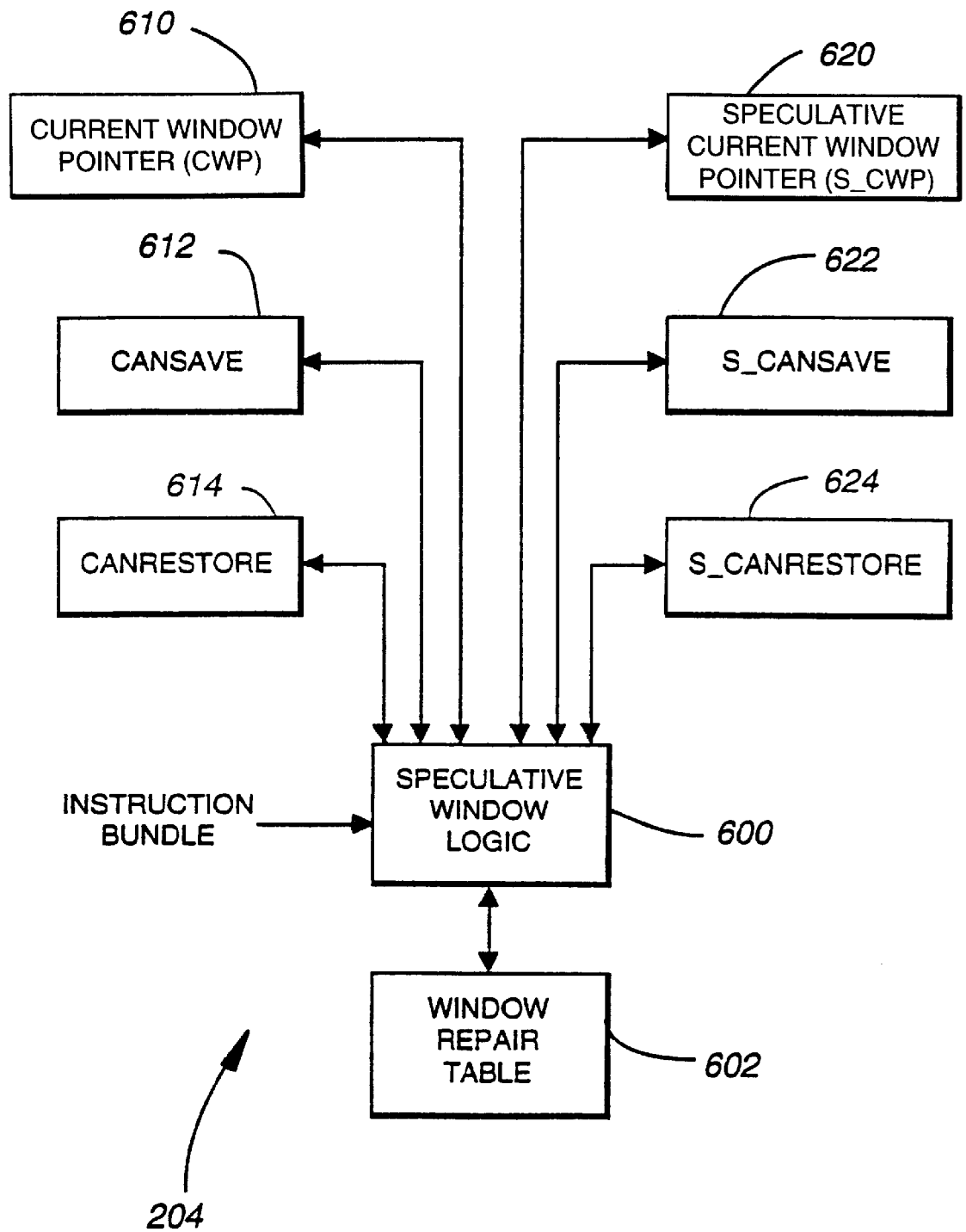
FIG. 6 illustrates the speculative window logic 600 for restoring the speculative copies of the window management control registers with a window repair table 602 upon a branch misprediction, in accordance with the present invention.

Referring to FIG. 6, in order to handle the possibility of a mispredicted instruction in the instruction bundle affecting the current window, IRU 204 has speculative window logic 600 which maintains a local "speculative" copy of the architectural window management registers. These architectural registers comprise the CWP register 610 (shown as 306 in FIGS. 3 and 5), the CANSAVE register 612, and the CANRESTORE register 614. The speculative copies include a speculative current window pointer (S_CWP) register 620, a speculative CANSAVE (S_CANSAVE) register 622, and a speculative CANRESTORE (S_CANRESTORE) register 624.

The speculative copies of the architectural window management registers are generally ahead of the processor (i.e., ahead of the values stored in the architectural window management registers), since the speculative copies are used to speculatively calculate the physical addresses of registers specified by an instruction in a bundle.

As previously mentioned, instructions following conditional branch instructions are fetched and speculatively processed within the processor. However, while these instructions following a predicted branch are being processed, it is not absolutely certain that these instructions will be executed (i.e., the branches are unconfirmed). A mispredicted branch could contain instructions which the controller received and then modified the speculative window registers such as the speculative copy 620 of the CWP.

Figure 7:
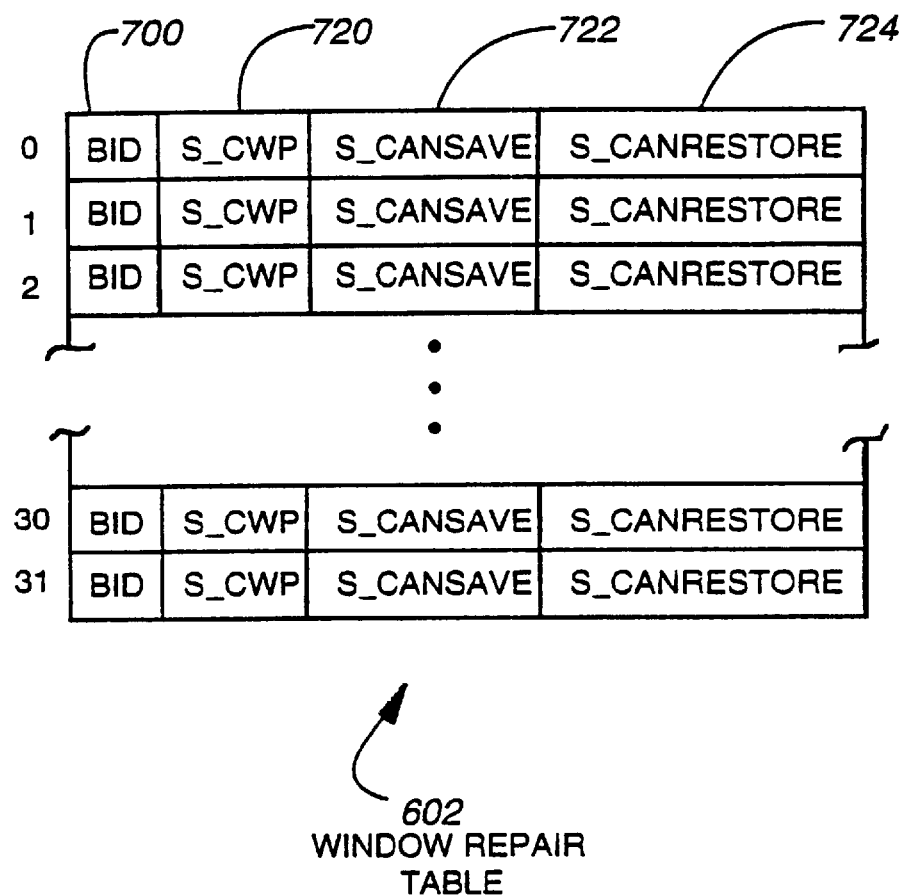
FIG. 7 illustrates a window repair table 602 in accordance with the present invention.

In accordance with the present invention, a window repair table 602 is utilized for ensuring the proper restoration of the speculative copies of the architectural window management registers upon a branch misprediction. FIG. 7 illustrates an embodiment of the window repair table 602. The table contains an entry for each branch instruction received by the IRU. A branch identification (BID) field 700 identifies the particular branch instruction. Along with the BID, the table contains the values of the speculative registers at the time the branch instruction was received by the IRU. Fields 720, 722, and 724 are shown containing the values of the S_CWP, S_CANSAVE, and S_CANRESTORE. These values are essentially backup copies of the values in the speculative registers at the time the branch instruction was detected.

Upon a branch mispredict, the state of the speculative registers is restored to their respective states prior to processing the instructions of the mispredicted branch. The speculative window logic 600 (FIG. 6) copies the values 720, 722, and 724 from the window repair table 602 (corresponding to the mispredicted branch) to the speculative registers 620, 622, and 624. In this way, the speculative registers are restored to their values prior to possible corruption due to processing of mispredicted instructions.

While the invention has been particularly shown and described with reference to a preferred embodiment thereof, it will be understood by those skills in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. A method for speculatively calculating a physical register address from a logical register address specified by an instruction in a processor, the method comprising the steps of:

providing a register file comprising a plurality of registers, a portion of said registers accessible through a window movable within said register file, each register uniquely identified within said window by a logical address;

providing a window pointer register maintaining a value corresponding to the location of said window in said register file;

maintaining a speculative value of said window pointer register;

identifying an instruction expected to modify the value in the window pointer register;

in response to said identifying step, modifying the speculative value; and converting said instruction specified logical address to a physical address based on the speculative value of said window pointer register.

2. The method of claim 1, wherein said identifying step further comprises:

detecting a privileged instruction modifying said window pointer register; and in response to said detecting step, updating the speculative value with the value stored in the window pointer register.

3. The method of claim 1, wherein said identifying step further comprises:

detecting that said instruction resulted from a mispredicted branch instruction.

4. The method of claim 1, wherein said identifying step further comprises:

detecting that said instruction is expected to cause a window overflow exception.

5. The method of claim 1, wherein said identifying step further comprises:

detecting that said instruction is expected to cause a window underflow exception.

6. The method of claim 1, further comprising the steps of:

maintaining a savable window value corresponding to a number of register windows available for use in said register file; and maintaining a speculative value of said savable window value.

7. The method of claim 6, further comprising the step of:

speculatively detecting a window overflow exception if said speculative window value indicates there are no register windows available and said identification step identifies a SAVE instruction.

8. The method of claim 1, further comprising the steps of:

maintaining a restorable window value corresponding to a number of stored register windows in said register file available for restoration; and maintaining a speculative value of said savable window value.

9. The method of claim 8, further comprising the step of:

speculatively detecting a window underflow exception if said restorable window value indicates there are no register windows for restoration and said identification step identifies a RESTORE instruction.

10. The method of claim 1, further comprising the steps of: providing a table storing a plurality of entries, each entry specifying a branch instruction; and maintaining a backup copy of the speculative value of said window pointer register.

11. The method of claim 10, further comprising the step of:

updating the speculative window pointer register with said backup copy upon detecting a branch misprediction corresponding to said branch instruction.

\* \* \* \* \*